US012124951B2

(12) United States Patent
Bacelis et al.

(10) Patent No.: US 12,124,951 B2
(45) Date of Patent: *Oct. 22, 2024

(54) SYSTEMS AND METHODS FOR VERIFYING MACHINE-READABLE LABEL ASSOCIATED WITH MERCHANDISE

(71) Applicant: Walmart Apollo, LLC, Bentonville, AR (US)

(72) Inventors: Carlos Bacelis, Rogers, AR (US); Andrew Funderburg, Bentonville, AR (US); Cody J. Doughty, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 540 days.

This patent is subject to a terminal disclaimer.

(21) Appl. No.: 17/461,535

(22) Filed: Aug. 30, 2021

(65) Prior Publication Data

US 2021/0390308 A1   Dec. 16, 2021

Related U.S. Application Data

(63) Continuation of application No. 16/257,238, filed on Jan. 25, 2019, now Pat. No. 11,120,265.

(Continued)

(51) Int. Cl.
*G06N 3/08* (2023.01)
*G06F 18/21* (2023.01)
(Continued)

(52) U.S. Cl.
CPC ............ *G06N 3/08* (2013.01); *G06F 18/2178* (2023.01); *G06F 18/41* (2023.01); *G06K 7/1482* (2013.01);
(Continued)

(58) Field of Classification Search
CPC ...... G06N 3/08; G06N 3/084; G06F 18/2178; G06F 18/41; G06K 7/1482; G06V 20/20; G06V 20/52

See application file for complete search history.

(56) References Cited

U.S. PATENT DOCUMENTS 5,973,731 A   10/1999 Schwab
7,044,370 B2   5/2006 Bellis, Jr. et al.
(Continued)

OTHER PUBLICATIONS

Young, Lee W., "International Search Report and Written Opinion", International Application No. PCT/US2019/015073, mailed Apr. 15, 2019, 10 pages.

(Continued)

*Primary Examiner* — Samir A Ahmed

(57) ABSTRACT

A system for verifying a machine-readable label comprises a scan table processing device comprising a first input for receiving a list of items with machine-readable labels; a second input for receiving a list of stores that have an inventory of the items in the list of items and that have at least one sensing device for capturing images of the items; and an output that includes a plurality of electronic records. The system further comprises a data repository that stores the captured images of the items and that updates the electronic records to include an association to the captured images; a graphical user interface (GUI) processing apparatus that modifies the captured images in preparation for training an artificial intelligence apparatus to identify the items in the images; and a machine language (ML) model processor that determines whether the images training the artificial intelligence apparatus are correctly identified with machine-readable labels associated with the items.

20 Claims, 9 Drawing Sheets

Related U.S. Application Data

(60) Provisional application No. 62/624,510, filed on Jan. 31, 2018.

(51) Int. Cl.
  *G06F 18/40* (2023.01)
  *G06K 7/14* (2006.01)
  *G06N 3/084* (2023.01)
  *G06V 20/20* (2022.01)
  *G06V 20/52* (2022.01)

(52) U.S. Cl.
  CPC ............. *G06N 3/084* (2013.01); *G06V 20/20* (2022.01); *G06V 20/52* (2022.01)

(56) References Cited

U.S. PATENT DOCUMENTS

| | | |
|---|---|---|
| 7,422,147 B2 | 9/2008 | Rosenbaum |
| 8,336,761 B1 | 12/2012 | McCloskey |
| 8,448,859 B2 | 5/2013 | Goncalves et al. |
| 8,528,820 B2 | 9/2013 | Trajkovic et al. |
| 9,477,955 B2 | 10/2016 | Goncalves |
| 9,672,523 B2 | 6/2017 | Huang |
| 9,779,603 B1 | 10/2017 | Subramanian et al. |
| 9,870,565 B2 | 1/2018 | Migdal et al. |
| 11,120,265 B2 * | 9/2021 | Bacelis .................. G06V 20/52 |
| 2002/0073046 A1 | 6/2002 | David |
| 2004/0250083 A1 | 12/2004 | Schwab |
| 2007/0112968 A1 | 5/2007 | Schwab |
| 2009/0060259 A1 | 3/2009 | Goncalves |
| 2009/0272801 A1 | 11/2009 | Connell, II et al. |
| 2010/0138037 A1 | 6/2010 | Adelberg et al. |
| 2013/0173435 A1 | 7/2013 | Cozad, Jr. |
| 2014/0136652 A1 | 5/2014 | Narayanaswami et al. |
| 2015/0054959 A1 | 2/2015 | He et al. |
| 2015/0193780 A1 | 7/2015 | Migdal et al. |
| 2017/0032382 A1 | 2/2017 | Shulman et al. |
| 2017/0323376 A1 | 11/2017 | Glaser et al. |
| 2018/0053312 A1 | 2/2018 | Ross et al. |
| 2018/0060630 A1 | 3/2018 | Nachtrieb |

OTHER PUBLICATIONS

Nickitas-Etienne, Athina, International Preliminary Report on Patentability, International Application No. PCT/US2019/015073, mailed Aug. 13, 2020, 9 pages.

Canadian Office Action issued Aug. 26, 2021 in connection with Canadian Application No. 3,090,092, 5 pages.

* cited by examiner

1) Test a trained neural network using CCTV footage

On this trial, the model classified everything as a container of whipped cream (Cool Whip™)
- 92% confident it was a container of whipped cream when it actually was a container of whipped cream
- 74% confident it was a container of whipped cream when it instead incorrectly classified as a different item (Cheez It™)

92% accuracy on the container of whipped cream after training on 28 images.

25% on a different item Its after training on 30 images.
Here, the model incorrectly classified the other item as whipped cream.

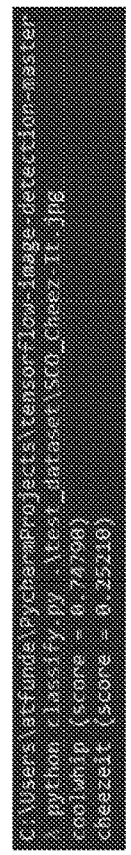

FIG. 9A

FIG. 9B

SYSTEMS AND METHODS FOR VERIFYING MACHINE-READABLE LABEL ASSOCIATED WITH MERCHANDISE

CROSS REFERENCE TO RELATED APPLICATION

This application claims priority to U.S. Non-Provisional application Ser. No. 16/257,238, filed Jan. 25, 2019, entitled "Systems and Methods for Verifying Machine-Readable Label Associated with Merchandise", which claims priority to U.S. Provisional Patent Application entitled "Systems and Methods for Verifying Machine-Readable Label Associated with Merchandise," Ser. No. 62/624,510, filed Jan. 31, 2018, the disclosures of which are hereby incorporated entirely herein by reference.

FIELD OF THE DISCLOSURE

The present disclosure relates generally to asset protection, and more specifically to systems and methods for determining whether a merchandise item has a correct machine-readable label.

BACKGROUND

Barcode switching is a form of retail theft, where a barcode, quick response (QR) code, universal product code (UPC), or related machine-readable label is removed from a low cost item and affixed to a more expensive item. When the label is scanned at a checkout counter, the more expensive item is sold at the price of the low cost item, resulting in a loss to the retailer and inaccuracy in inventory information, for example, generated by a perpetual inventory system.

SUMMARY

In one aspect, provided is a system for verifying a machine-readable label, comprising: a scan table processing device comprising: a first input for receiving a list of items with machine-readable labels; a second input for receiving a list of stores that have an inventory of the items in the list of items and that have at least one sensing device for capturing images of the items; and an output that includes a plurality of electronic records that each includes a time and location of a scan operation performed on at least one machine-readable label of the machine-readable labels. The system further comprising a data repository that stores the captured images of the items and that updates the electronic records to include an association to the captured images; a graphical user interface (GUI) processing apparatus that modifies the captured images in preparation for training an artificial intelligence apparatus to identify the items in the images; and a machine language (ML) model processor that determines whether the images training the artificial intelligence apparatus are correctly identified with machine-readable labels associated with the items.

In some embodiments, the list of items includes items of interest that are identified as being at risk of theft.

In some embodiments, a record for each of the list of stores includes a unique facility identifier and information about sensors available for generating images of items of interest of the list of items.

In some embodiments, the output of the scan table processing device includes a table comprising a plurality of data records, which includes at least one of a store identification, a time of the scan operation performed on the at least one machine-readable label, and an identification of a checkout register where the scan operation is performed.

In some embodiments, the output of the scan table processor includes a time stamp that identifies an image from a video feed taken of an item of interest at a store of the list of stores that is of interest with respect to confirming whether a machine-readable label is associated with a correct item.

In some embodiments, the GUI processing apparatus compares the captured images and positively identified images of the items to determine whether the captured images are qualified for input to the artificial intelligence apparatus.

In some embodiments, the artificial intelligence apparatus includes a trained neural network that recognizes a scanning apparatus that performs a scan operation performed on the at least one machine-readable label to distinguish the scanning apparatus from the item at which the at least one machine-readable label is located.

In some embodiments, the ML model processor generates an event in response to a determination that the machine-readable label is associated with an incorrect item at which the at least one machine-readable label is located.

In another aspect, provided is a system for verifying a machine-readable label, comprising: a listing of a plurality of stores that have an item of interest identified by contents of a machine-readable label affixed to the item; a label processing apparatus that compares the machine-readable label affixed to the item and a valid image of the item to train a neural network; and a machine learning (ML) apparatus that identifies the image of the item to which the machine-readable label is affixed.

In some embodiments, the listing includes a time stamp that identifies when the item of interest was scanned, identifies a store of the plurality of stores, an identification of a register at the identified store where the item is scanned, and an index value that provides an electronic storage location of an image generated at a day and time stated in the time stamp.

In some embodiments, a record for each of the stores includes a unique facility identifier and information about sensors available for generating images of items of interest of the listing.

In some embodiments, the system further comprises a graphical user interface (GUI) processing apparatus that modifies an image of the item for training an artificial intelligence apparatus to identify the item in the image.

In some embodiments, the GUI processing apparatus compares the captured images and positively identified images of the items to determine whether the captured images are qualified for input to the artificial intelligence apparatus.

In some embodiments, the artificial intelligence apparatus includes a trained neural network that recognizes a scanning apparatus that performs a scan operation performed on the at least one machine-readable label to distinguish the scanning apparatus from the item at which the at least one machine-readable label is located.

In some embodiments, the ML model processor generates an event in response to a determination that the machine-readable label is associated with an incorrect item at which the at least one machine-readable label is located.

In another aspect, provided is a method for verifying a machine-readable label, comprising: providing a listing of a plurality of stores that have an item of interest identified by contents of a machine-readable label affixed to the item;

comparing, by a label processing apparatus, the machine-readable label affixed to the item and a valid image of the item to train a neural network; and identifying, by machine learning (ML) apparatus, the image of the item to which the machine-readable label is affixed.

BRIEF DESCRIPTION OF THE DRAWINGS

Exemplary embodiments will now be described, by way of example only, with reference to the following drawings, in which:

FIGS. 9A and 9B are examples of a system of FIGS. 1-8 testing a trained neural network using a closed circuit television (CCTV) apparatus, in accordance with some embodiments.

DETAILED DESCRIPTION

In brief overview, embodiments of the present concept include a system that minimizes the time necessary to identify bar code switching activities, improves the accuracy of detection, and automates the detection and response protocol of each event related to such activities.

Figure 1:
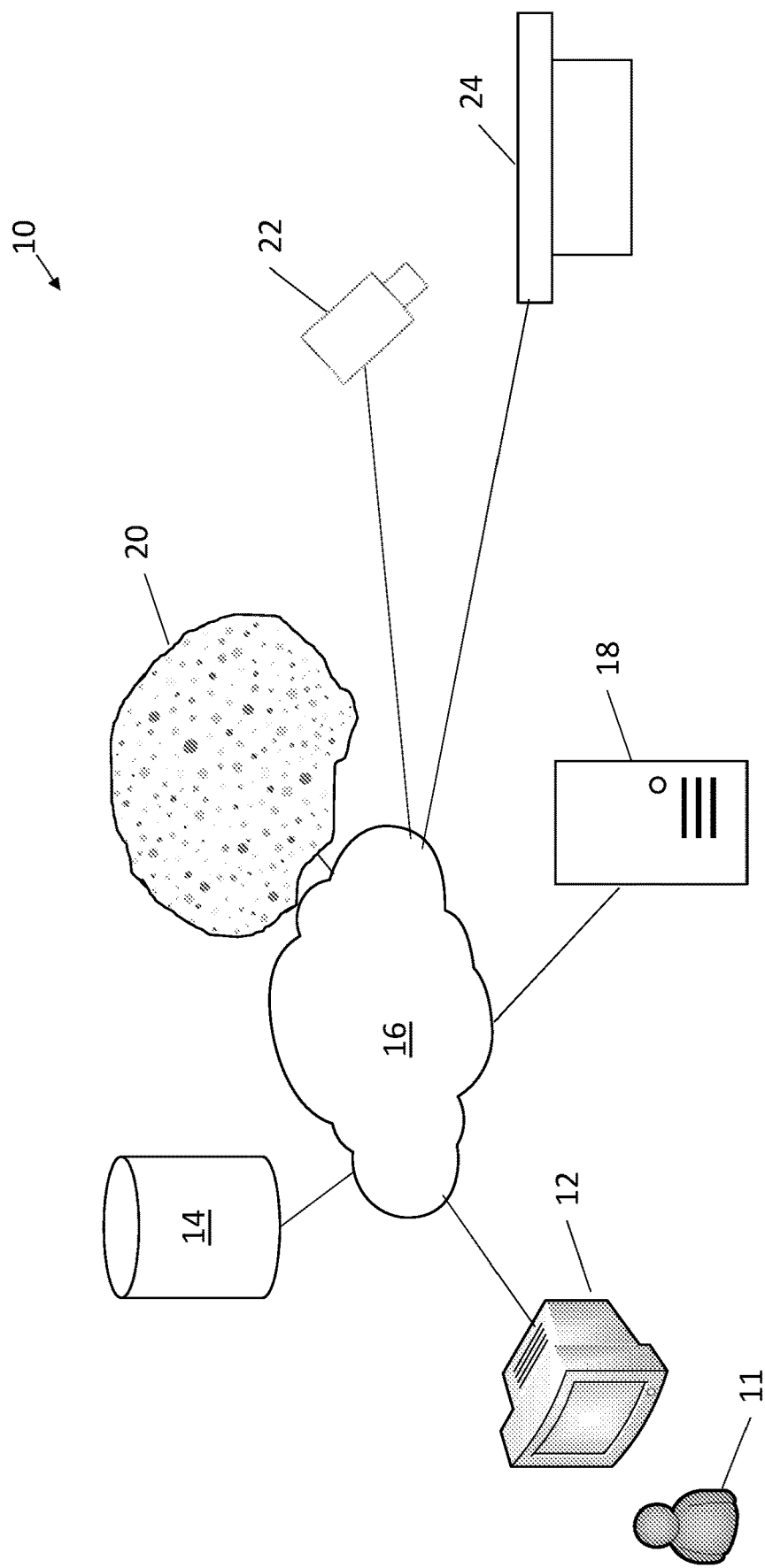
FIG. 1 is a diagram of an environment in which embodiments of the present inventive concepts may be practiced.

FIG. 1 is a diagram of an environment 10 in which embodiments of the present inventive concepts may be practiced.

The environment 10 may include but not be limited to a graphical user interface (GUI) processing apparatus 12, a data repository 14, a machine learning (ML) training apparatus 18, a neural network 20, a sensing device 22, and a scanning apparatus 24. Some or all of the GUI processing apparatus 12, a data repository 14, a machine learning (ML) training apparatus 18, a neural network 20, camera or other sensing device 22, and scanning apparatus 24 can communicate with each other and/or other electronic apparatuses that may include an electronic exchange of data via a network 16. The network 16 may be a local area network (LAN), a wide area network (WAN), and/or other communications network for transmitting electronic data.

Figure 2:
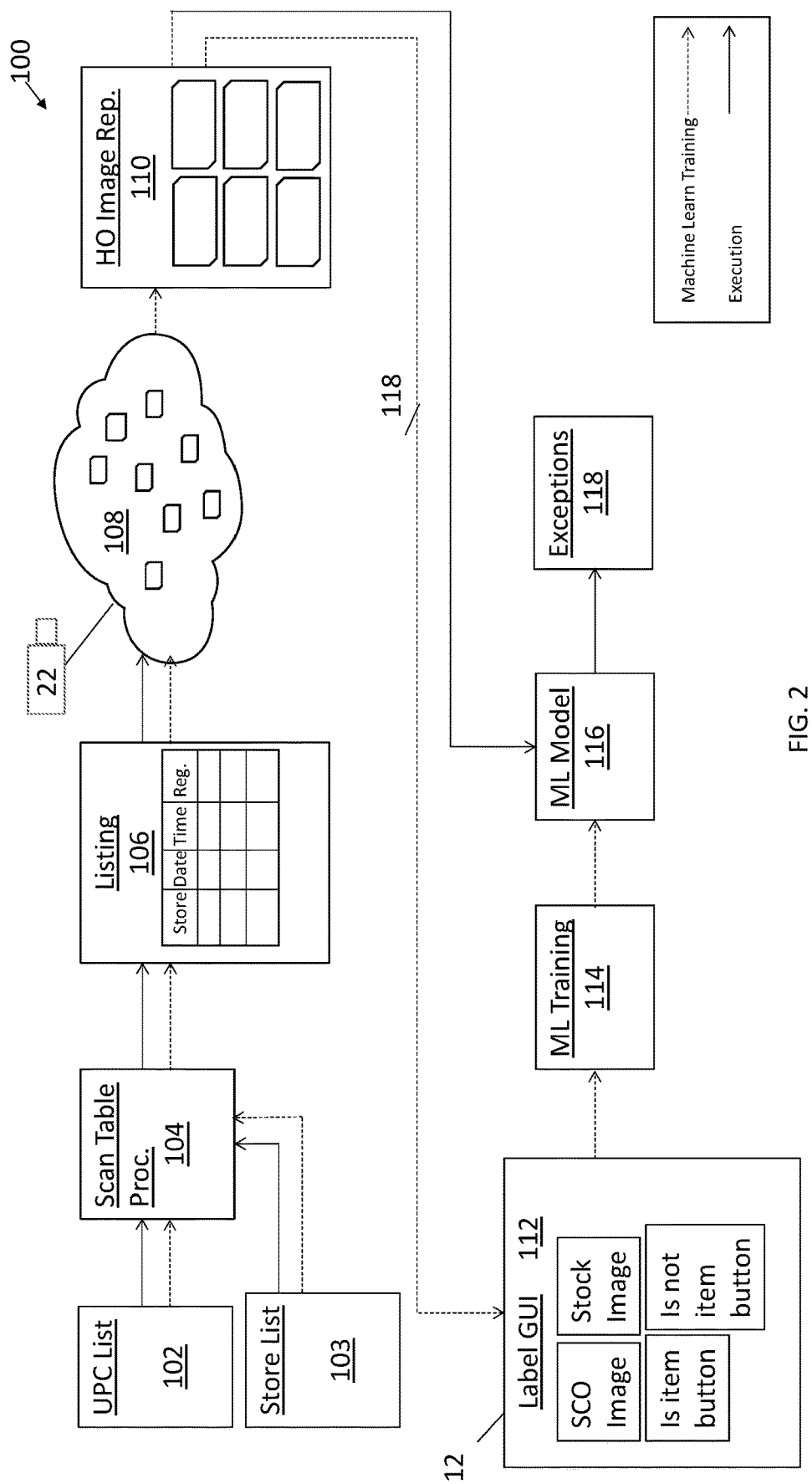
FIG. 2 is a flow diagram of a process for determining whether a machine-readable label is associated with a correct item, in accordance with some embodiments.

FIG. 2 is a flow diagram of a process 100 for determining whether a machine-readable label is associated with a correct item, in accordance with some embodiments. Some or all of the process 100 may be performed in the environment shown and described with respect to FIG. 1.

The server 18 may store and process a known UPC list 102, which includes a list of items with machine-readable labels, e.g., stock keeping units (SKUs). In some embodiments, the labels are laser printed "peel & stick" barcode labels or the like that are capable of being affixed to a surface of an item of merchandise or its packaging, but capable of being removed in its entirety for affixing to a different item of merchandise or its packaging. In other embodiments, the barcode labels may be printed using a commercially-available printer. The list 102 may include items of interest at risk of theft, fraud, and so on, and can be collected using historical data, data mining techniques, and so on. The UPC list 102 may be stored electronically, for example, at a database or the like that includes store-related data, such as inventory details and so on. The UPC list 102 may include records, fields, or other electronic data that includes associations to previous or similar items, for example, items sold in a previous season, limited time promotions, and so on.

The server 18 may store and process a store list 103 including a list of retail establishments that have one or more cameras 22 positioned over a checkout counter. The store list may include a list of stores that have an inventory of the items in the list of items of the UPC list 102. The server 18 may include one or more different computer processors at different locations but each connected to the network 16. The cameras 22 are preferably high quality video cameras, for example closed-circuit television (CCTV) video devices, but not limited thereto. For example, a camera 22 may be of high or low resolution, and with or without color 22. The cameras 22 are preferably part of a security monitoring system, for example, including digital video recorders (DVRs), video analysis software, and so on. In some embodiments, the checkout counter is a self-checkout (SCO) counter or the like that includes point of sale (POS) devices for allowing customers to purchase store items with minimal or no assistance from a store associate. Although a camera 22 is shown and described, other sensing devices such as stereoscopic cameras, infrared, or IR sensors may be used in addition to or as an alternative to a camera, in particular any device capable of providing item unique attributes, such as size, shape, color, temperature, mass, weight, and so on.

The store list 103 may be generated from existing asset inventory sheets, user-identified CCTV systems, and/or other store servers or data repositories used by retail establishments. The store list 103 may include but not be limited to a store number or other unique facility identifier, camera or other available device information, device location or position information, channel or address, for example, for identifying each sensing device available for collecting images or other data regarding an item of interest. This information may be generated as a record for each of the list of stores and stored at the data repository 14.

Contents of the UPC list 102 and store list 103 are input to a scan table processing device 104. The scan table processor 104 is a computer hardware processor, for example, part of the server 18, and may include a memory device or otherwise communicate with a storage device such the data repository 14 or the like to store and retrieve data to generate the scan table 104 and/or results generated by the scan table processor 104. In some embodiments, the scan table 104 is constructed and arranged into a plurality of rows and columns, where each row includes data regarding an item scanned at a checkout counter. Each column includes data identifying a store having security cameras at its checkout counters. The scan table processor 104 can output a listing 106 or table, matrix, or the like that includes one or more stores that have an item of interest identified by the contents of a machine-readable label affixed to the item. The listing 106 may include a date/time stamp that identifies when the item of interest was scanned, identifies the particular store, includes a register location/number reference and includes an index value that may direct the system to a set of images taken at the identified store at the date/time stamp, for example, a register (reg.) identifying the location and type of register used, for example, a unique identification to determine the location of an item scan operation.

The digital video recorders (DVRs) of the cameras 22, or related security monitoring system, records video clips of a checkout location in a digital format to a storage device 108. The video clips can be partitioned into still images and placed into an image repository, for example, which stores digital data via the network 16 accessible for training the neural network 20 and auditing the images.

At block 110, the digital images are shown as stored prior to evaluation/analysis, for example, either for training or for artificial intelligence processing. The images may be categorized by the scan table listing 106. For example, the listing 106, or output of the scan table processor 104, can include a date/time stamp that identifies a particular photograph from a video feed taken at a particular store, which may be of interest with respect to confirming whether a barcode is associated with a correct item.

In another example, a determination is made that an item is scanned at 2:30 p.m. at a given register having GUI processing apparatus 12. An image stored at block 110 may contain the snapshot image of the register scan taken at the scanning apparatus 24, indicating that activity that occurred at the identified register at 2:30 p.m. At block 112, a training process by the neural network 20 and/or other artificial intelligence system may be performed. In particular, the image is evaluated and notated at GUI processing apparatus 12, and selected as being ingested into an artificial intelligence system for training and/or enhancement purposes. In this example, a data repository at which the listing 106 is stored serves as the database storing all the reference and relevant materials needed to triangulate which cameras/time combinations need to be collected from storage device 108 and loaded into the repository at block 110.

Figure 3:
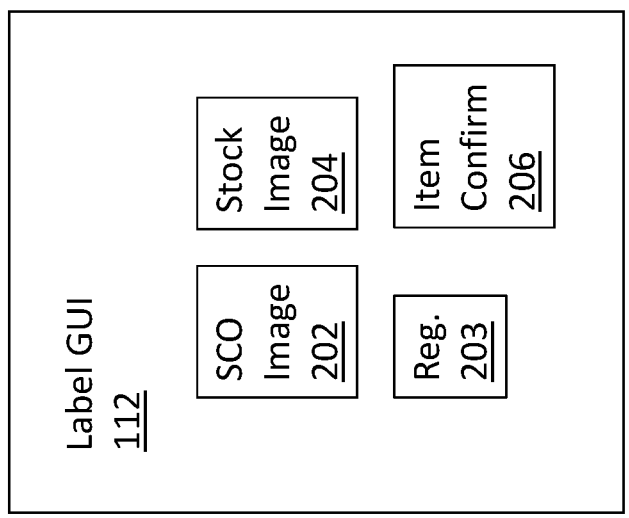
FIG. 3 is a block diagram of a label graphical user interface (GUI) processing apparatus, in accordance with some embodiments.

The stored images in the repository at block 110 may be analyzed at block 112 by a label graphical user interface (GUI) processing apparatus 12. As shown in FIG. 3, the label GUI processing apparatus at block 112 may include but not be limited to an SCO image processor 202, a stock image processor 204, and an item confirmation processor 206. The SCO image processor 202 processes an image of an item of interest from the repository 110. A scanner bed of a register 203 or other sensor apparatuses may process images of the item, to capture relevant features such as various angles, stock product images, and so on to confirm the item's scannable label matches the actual item scanned at the register 203. The stock image processor 204 displays an image of a known item. The images can be viewed by a user 11 to determine whether the images are of the same item. If so, then the user 11 can select a display button indicating whether the items are the same or different. Users may also select at the (GUI) processing apparatus 12 or a display or other computer in communication with the (GUI) processing apparatus 12 one or more multiple attributes to add additional context to image to further refine and improve detection variables. Attributes may include but not be limited to other contexts such as lighting, hand or unrelated object in area, image error, incorrect image retrieved, blurriness, and so on. Alternatively, the item confirmation processor can perform an electronic analysis of the two images and provide an automatic representation according to an object recognition application or other image analysis software. More specifically, an item confirmation may be provided to the trainer with one or more reference samples for comparison. After the AI system is trained, it may provide an electronic analysis for reinforcement of the AI system/neural network 20.

Referring again to FIGS. 1 and 2, as previously described, the GUI processing apparatus 12 is constructed and arranged to train an artificial neural network 20, which is applied at block 112 to identify the images by processing learning material from the image data. The results, e.g., cropped images, generated by the GUI processing apparatus 12 are output to a machine learning (ML) apparatus at block 114, where the training data is ingested by a machine learning apparatus, which in turn may be incorporated by the neural network 20 for identifying the item.

A machine language (ML) model 116 may be implemented that identifies images of items with machine-readable labels. The ML model 116 receives at another input data interrupted from the image and used that to weigh it against known data for the item to render a decision or score on the scan accuracy. An exception list/triggering event 118 is generated from a comparison of the two inputs at the ML model 116 that includes an alert or exception regarding an item to which a scanned machine-readable label is associated that is not recognized. This detection and trigger event will occur in near real time when not training. The alert or exception may be output via the network 16 or via a local wireless connection such as Bluetooth or the like to a personal computer, a visual and/or audio alarm at the checkout counter, suspension of the current checkout transaction until authorized personnel are able to respond, security personnel notification, and so on.

Figure 4:
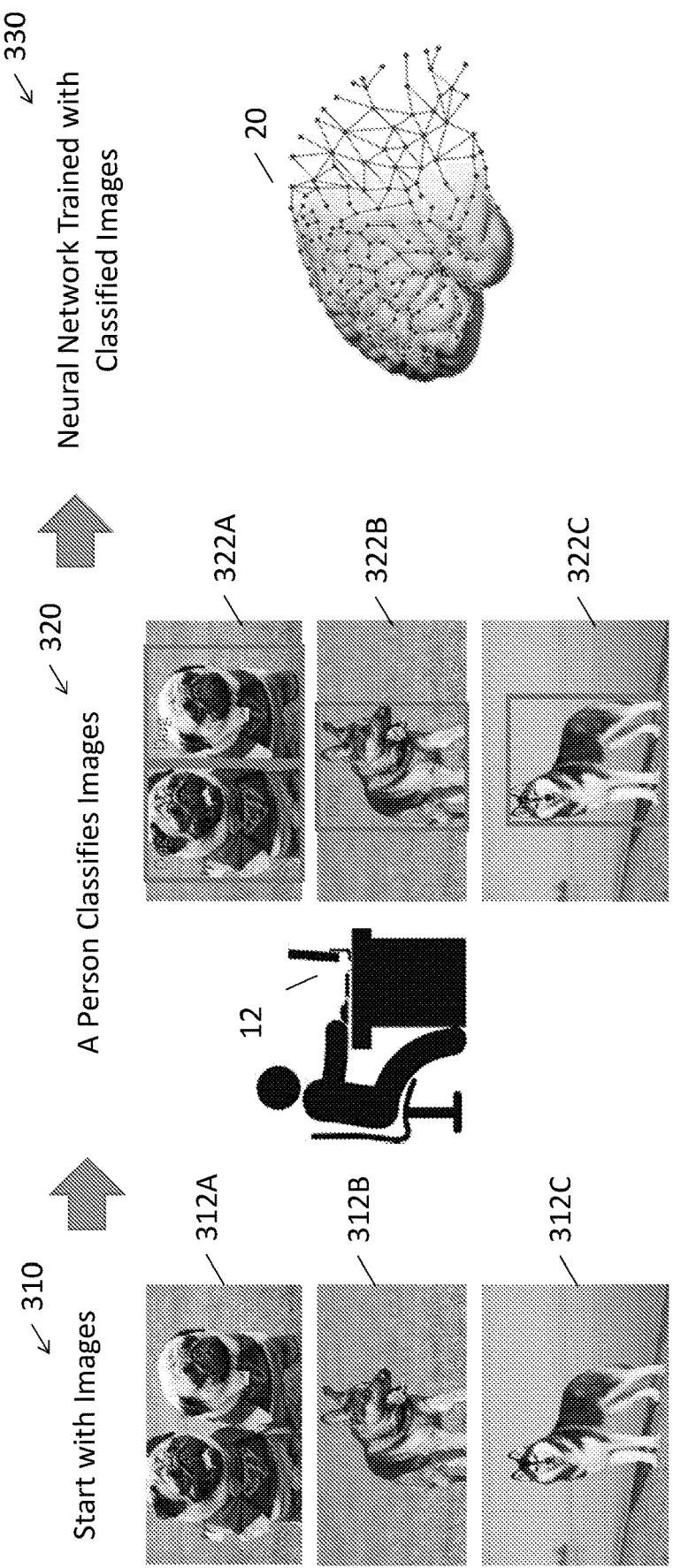
FIG. 4 is a flow diagram of a process for training a neural network, in accordance with some embodiments.

Referring to FIG. 4, a process for training the neural network 20 by GUI processing apparatus 12 requires the receipt (310) by the GUI processing apparatus 12 of set of images 312A-C (generally, 312). The GUI processing apparatus 12 includes a display for visually displaying the images 312, where a user and/or computer program may annotate or otherwise modify the images 312. For example, the user 11 may classify (320) the images, for example, by identifying the images. In some embodiments, the images 312 are classified for each SKU in a store. The classified images 322A-C (generally, 322), also referred to as training images, are output to the neural network 20. In training the neural network 20, an iterative learning process is executed in which the classified images 322 are processed, and the neural network 20 are trained to recognize the object, e.g., dog, displayed in the images. Although a dog is shown in this example in FIG. 4, the system is constructed and arranged to recognize merchandise such as retail goods for purchase. In some embodiments, thousands of images or more are required to train the neural network 20 on a single concept, such as the dog shown in FIG. 4, or more relevant products labelled with a SKU. In some embodiments, the system is constructed and arranged to recognize goods for purchase. In other embodiments, the retaining and adjusting of parameters regarding item identification and confirmation permits the system to I recognize other objects of interest not limited to items of interest for establishing whether a fraudulent purchase is being accepted. For example, other applications may equally apply such as store associates wearing an item such as a vest, cap, and so on, which can be used to track and audit staffing coverage.

Figure 6:
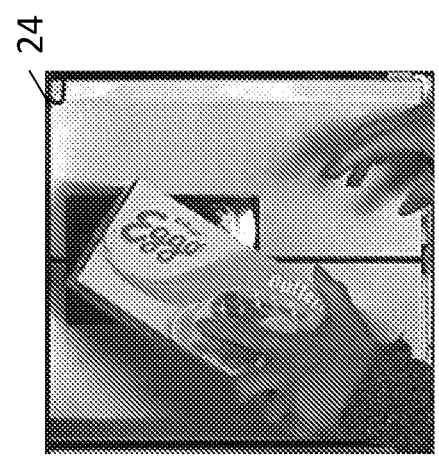
FIGS. 5 and 6 are examples of images of a scanning apparatus used for training a neural network, in accordance with some embodiments.
Figure 5:
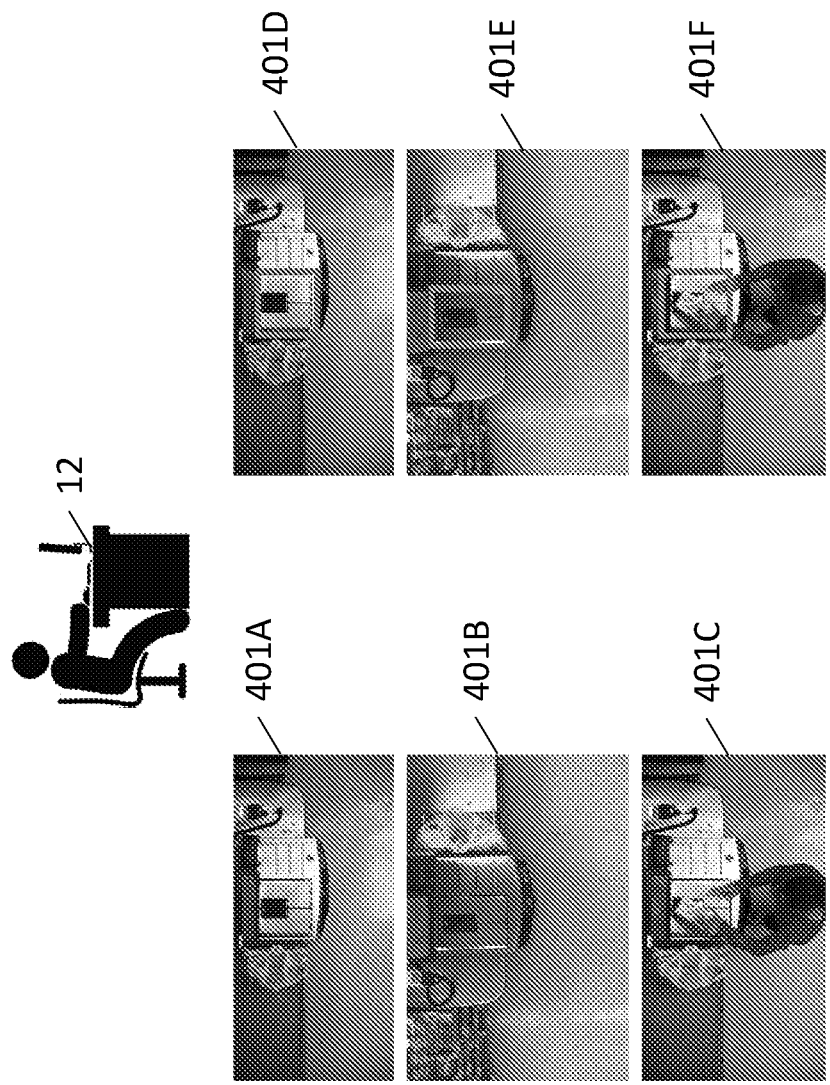
Figure 7:
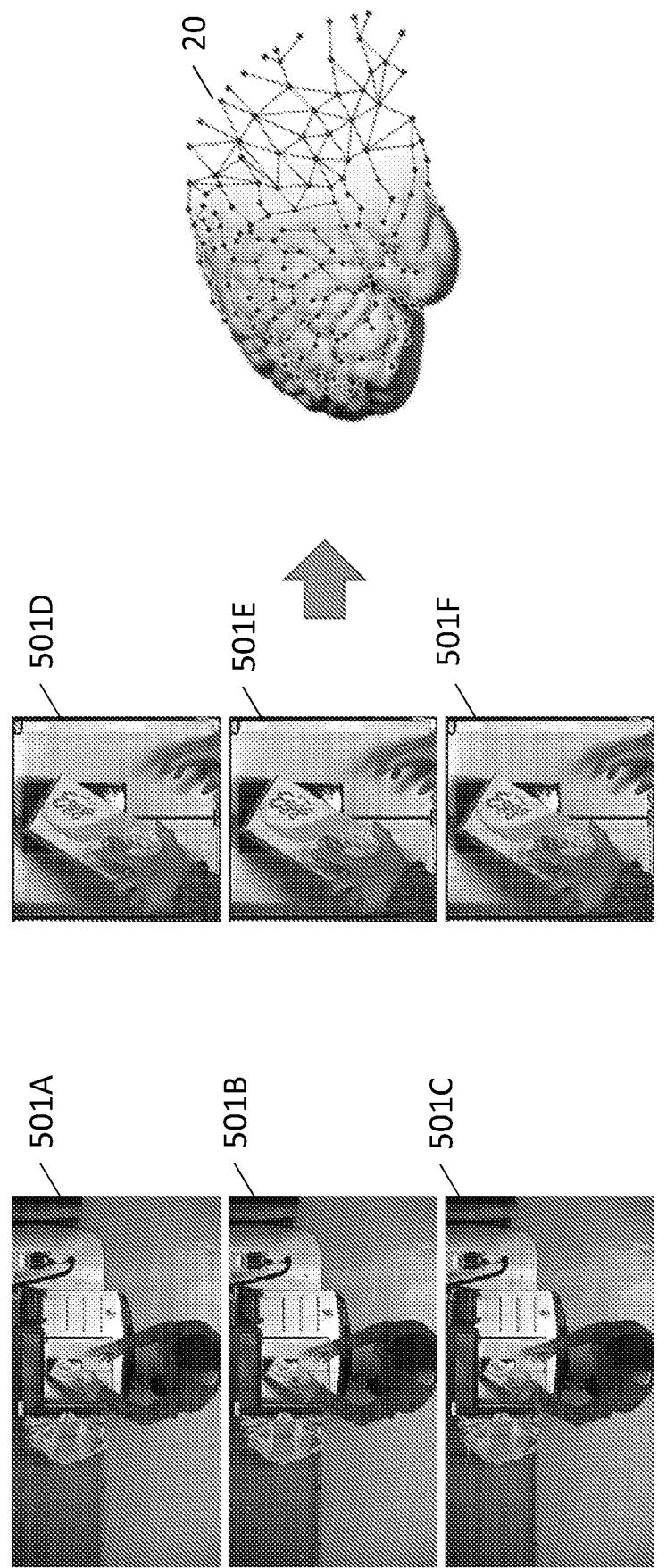
FIG. 7 illustrates examples of additional images used for training a neural network, in accordance with some embodiments.

One of the challenges with training a neural network 20 is identifying and classifying objects, namely, store items, in images taken at a checkout counter. When such images are captured, other objects such as a human hand or the portions of the scanning apparatus 24 may be in the field of view of the camera 22. Referring to FIG. 5, a plurality of images 401A-F (generally, 401) may be captured and used to create a neural network to identify the scanning apparatus 24. As shown in FIG. 6, an image 401F shown in FIG. 5 can be cropped or otherwise edited by the GUI processing apparatus 12. The image 401F can be tagged with a UPC and item description and/or other identifier of the object in the image 401F. The number of training images is greater than one, and preferably at least one thousand to ten thousand images for each SKU. Each image may have a similar background, for example, a human hand, scanning apparatus, and so on. Training the neural network 20 to recognize the background may improve the ability of the neural network 20 to identify the object. A process is performed multiple times for each SKU. For example, multiple images, angles, lighting backgrounds, skin tones, and so on with respect to the image are collected and processed to gain an accurate reading and identification of the background of the image in order to improve item recognition accuracy. Other sensors such as thermal sensors or the like may also be provided for identifying items of interest. Therefore, a register having a scanner 24 can provide information on what items were scanned at a particular time, and the camera 22 can provide images taken at that time around the scanner 24. The GUI processing apparatus 12 can annotate the item of interest, for example, a box of waffles, relative to the regions around the item to train the neural network 20 with accuracy. In some embodiments, the trained neural network 20 that recognizes the scanner 24 and can distinguish it from other objects may provide a boundary or box, for example, shown in FIG. 5 around the scanner so that items inside the box are identified. As shown in FIG. 7, the images 501D-501F are cropped from images 501A-501C respectively, and used to train the neural network 20 to identify any item of merchandise notwithstanding the presence of the scanning apparatus 24.

Figure 8:
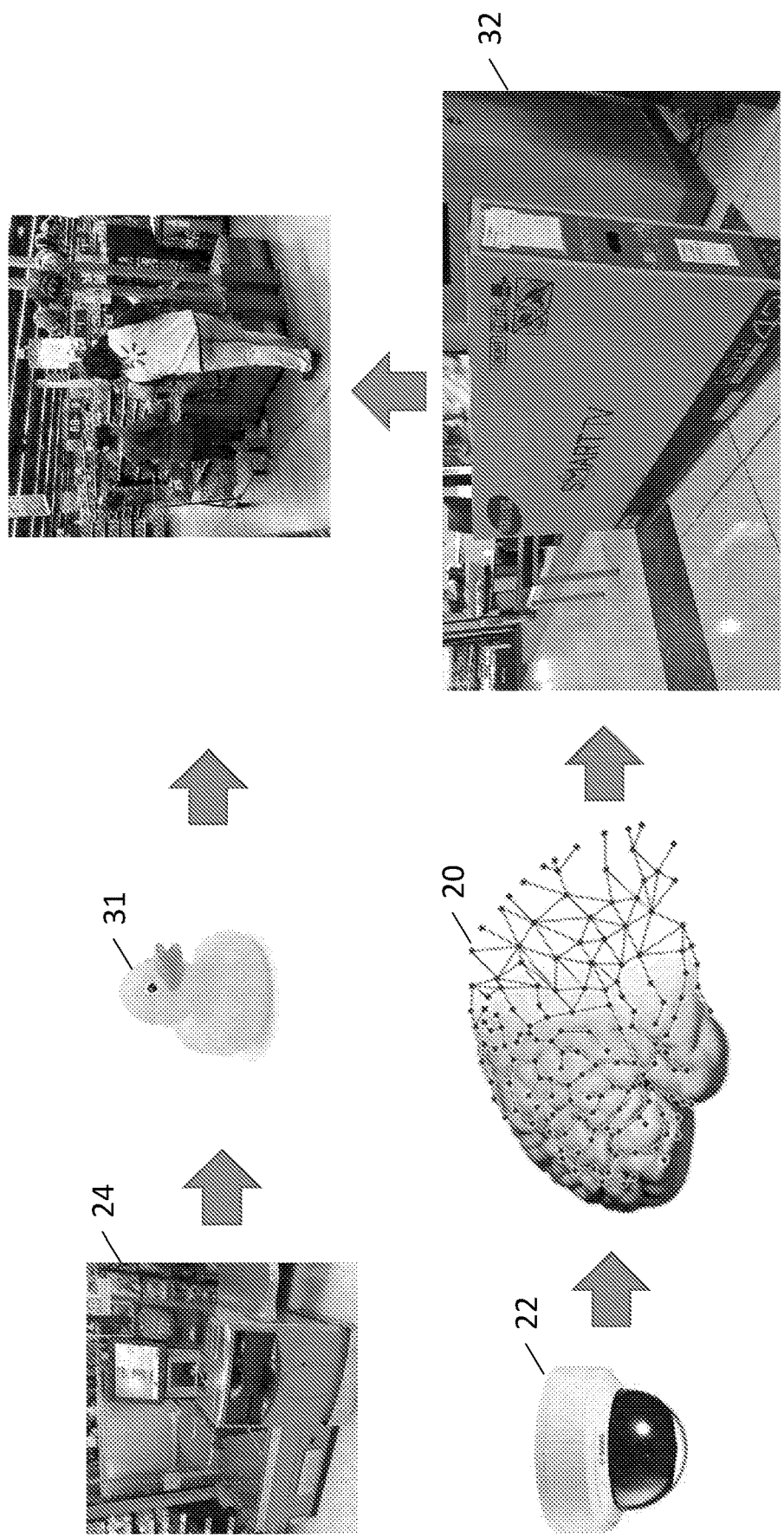
FIG. 8 is an illustrative example of an application of the environment of FIG. 1 and process of FIG. 2 for identifying a fraudulent switching of a label.

FIG. 8 is an illustrative example of an application of the environment 10 of FIG. 1 and process 100 for identifying a fraudulent switching of a label. In this example, a scanning apparatus 24 at a checkout register scans the UPC of an inexpensive toy 31. However, the UPC has been fraudulently removed from the toy 31 and placed on an expensive television set 32. A camera 22 captures an image of the television set at the scanner at the same time that the UPC is scanned. The neural network 20 determines that the item scanned does not fit the parameters for the toy, whereby an alert is automatically generated.

Figure 10:
FIG. 10 is an example of a system of FIGS. 1-8 testing a trained neural network after cropping an image taken by a CCTV apparatus, in accordance with some embodiments.

FIGS. 9A and 9B are views of the results of a process for training a neural network on a predetermined number of photographs taken of an item of interest. The results here illustrate that the model may misclassify an item in a greater number of cases than when the images are cropped, for example, shown in FIG. 10. For example, a CCTV image may be cropped so that the item of interest resting on a flatbed checkout scanner is shown. The neural network, when trained, can classify with a higher degree of accuracy, even when the same sampling of training images, for example, 30 or so images as shown in FIGS. 9A and 9B.

The embodiments and examples set forth herein are presented in order to best explain the present invention and its practical application and to thereby enable those of ordinary skill in the art to make and use the invention. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

What is claimed is:

1. A system for verifying a machine-readable label, comprising:
   a scan table processing device that provides, to a data repository, a listing a plurality of stores that have an item of interest identified by contents of a machine-readable label affixed to the item and that have a sensing device for capturing images of the item to which the machine-readable label is affixed;
   a label processing apparatus that compares the captured images with the machine-readable label affixed to the item from the data repository and a valid image of the item to produce modified training images for use as training data; and
   a machine learning (ML) apparatus trained with the training data from the label processing apparatus to identify the item from the captured images of the item to which the machine-readable label is affixed and determine whether the item from the captured images corresponds with item data of the machine-readable label affixed to the item.

2. The system of claim 1, wherein the listing further includes a time stamp that identifies when the item of interest was scanned, identifies a store of the plurality of stores, an identification of a register at the identified store where the item is scanned, and an index value that provides an electronic storage location of a scanned image generated at a day and time stated in the time stamp.

3. The system of claim 1, wherein a record for each of the stores includes a unique facility identifier and information about sensors available for generating images of items of interest of the listing.

4. The system of claim 1, wherein the modified training images of the item for training the ML apparatus are cropped versions of the captured images.

5. The system of claim 4, wherein the label processing apparatus compares captured images and positively identified images of the items to determine whether the captured images are qualified for input to the ML apparatus.

6. The system of claim 4, wherein the ML apparatus includes a trained neural network that recognizes a scanning apparatus that performs a scan operation performed on the machine-readable label to distinguish the scanning apparatus from the item at which the at least one machine-readable label is located.

7. The system of claim 1, wherein the ML apparatus generates an event in response to a determination that the machine-readable label is associated with an incorrect item at which the machine-readable label is located.

8. A method for verifying a machine-readable label, comprising:

providing to a data repository, by a scan table processing apparatus, a listing of a plurality of stores that have an item of interest identified by contents of a machine-readable label affixed to the item and that have a sensing device for capturing images of the item to which the machine-readable label is affixed;

generating training data, by a label processing apparatus, by comparing the captured images with the machine-readable label affixed to the item from the data repository and a valid image of the item to produce modified training images for use as training data;

identifying, by a machine learning (ML) apparatus, the item from the captured images of the item to which the machine-readable label is affixed, wherein the ML apparatus is trained using the training data; and determining, by the ML apparatus, whether the item from the captured images corresponds with item data of the machine-readable label affixed to the item.

9. The method of claim 8, wherein the listing further includes a time stamp that identifies when the item of interest was scanned, identifies a store of the plurality of stores, an identification of a register at the identified store where the item is scanned, and an index value that provides an electronic storage location of a scanned image generated at a day and time stated in the time stamp.

10. The method of claim 8, wherein a record for each of the stores includes a unique facility identifier and information about sensors available for generating images of items of interest of the listing.

11. The method of claim 8, wherein the modified training images are cropped versions of the captured images.

12. The method of claim 8, wherein the ML apparatus includes a trained neural network, further comprising:
recognizing a scanning apparatus that performs a scan operation performed on the machine-readable label to distinguish the scanning apparatus from the item at which the at least one machine-readable label is located.

13. The method of claim 12, further comprising:
receiving a captured image of the item, the captured image captured at a same time as a machine-readable label is scanned by a scanner device; and
determining that the item in the captured image does not fit parameters for a valid item associated with the machine-readable label.

14. The method of claim 8, further comprising:
generating, by the ML apparatus, an event in response to a determination that the machine-readable label is associated with an incorrect item at which the machine-readable label is located.

15. One or more non-transitory computer storage media, having computer-executable instructions for verifying a machine-readable label that, upon execution by a computer cause the computer to perform operations comprising:

providing to a data repository, by a scan table processing apparatus, a listing of a plurality of stores that have an item of interest identified by contents of a machine-readable label affixed to the item and that have a sensing device for capturing images of the item to which the machine-readable label is affixed;

generating training data, by a label processing apparatus, by comparing the captured images with the machine-readable label affixed to the item from the data repository and a valid image of the item to produce modified training images for use as training data;

identifying, by a machine learning (ML) apparatus, the item from the captured a scanned images of the item to which the machine-readable label is affixed, wherein the ML apparatus is trained using training data; and determining, by the ML apparatus, whether the item from the captured images corresponds with item data of the machine-readable label affixed to the item.

16. The one or more computer storage media of claim 15, wherein the listing further includes a time stamp that identifies when the item of interest was scanned, identifies a store of the plurality of stores, an identification of a register at the identified store where the item is scanned, and an index value that provides an electronic storage location of a scanned image generated at a day and time stated in the time stamp.

17. The one or more computer storage media of claim 15, wherein a record for each of the stores includes a unique facility identifier and information about sensors available for generating images of items of interest of the listing.

18. The one or more computer storage media of claim 15, wherein the modified training images are cropped versions of the captured images.

19. The one or more computer storage media of claim 15, wherein the ML apparatus includes a trained neural network, further comprising:
recognizing a scanning apparatus that performs a scan operation performed on the machine-readable label to distinguish the scanning apparatus from the item at which the at least one machine-readable label is located.

20. The one or more computer storage media of claim 3, further comprising:
receiving a captured image of the item, the captured image captured at a same time as a machine-readable label is scanned by a scanner device; and
determining that the item in the captured image does not fit parameters for a valid item associated with the machine-readable label.

* * * * *